(12) United States Patent
Lindholm et al.

(10) Patent No.: US 9,058,672 B2
(45) Date of Patent: Jun. 16, 2015

(54) USING A PIXEL OFFSET FOR EVALUATING A PLANE EQUATION

(75) Inventors: John Erik Lindholm, Saratoga, CA (US); Henry Packard Moreton, Woodside, CA (US); Ming Y. Siu, Santa Clara, CA (US); Stuart F. Oberman, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 839 days.

(21) Appl. No.: 12/898,537

(22) Filed: Oct. 5, 2010

(65) Prior Publication Data

US 2011/0081100 A1    Apr. 7, 2011

Related U.S. Application Data

(60) Provisional application No. 61/249,224, filed on Oct. 6, 2009.

(51) Int. Cl.
  *G06K 9/32*    (2006.01)
  *G06T 3/40*    (2006.01)

(52) U.S. Cl.
  CPC .................................. *G06T 3/4007* (2013.01)

(58) Field of Classification Search
  None
  See application file for complete search history.

(56) References Cited

U.S. PATENT DOCUMENTS

| | | | | |
|---|---|---|---|---|
| 6,377,265 | B1* | 4/2002 | Bong | 345/505 |
| 6,611,264 | B1* | 8/2003 | Regan | 345/422 |
| 7,893,947 | B2* | 2/2011 | Fang | 345/613 |
| 8,036,495 | B2* | 10/2011 | Takeshima et al. | 382/299 |
| 2002/0130863 | A1* | 9/2002 | Baldwin | 345/420 |
| 2002/0180748 | A1* | 12/2002 | Popescu et al. | 345/582 |
| 2004/0096094 | A1* | 5/2004 | Vacca et al. | 382/141 |
| 2005/0179698 | A1* | 8/2005 | Vijayakumar et al. | 345/611 |
| 2007/0008336 | A1* | 1/2007 | Bastos et al. | 345/613 |
| 2007/0064993 | A1* | 3/2007 | Oaki et al. | 382/144 |
| 2009/0102967 | A1* | 4/2009 | Weston | 348/451 |
| 2009/0238489 | A1* | 9/2009 | Metcalfe et al. | 382/266 |
| 2011/0229054 | A1* | 9/2011 | Weston et al. | 382/276 |
| 2011/0286635 | A1* | 11/2011 | Nishigaki | 382/107 |

* cited by examiner

*Primary Examiner* — Stephen R Koziol
*Assistant Examiner* — Sean Conner
(74) *Attorney, Agent, or Firm* — Artegis Law Group, LLP

(57) ABSTRACT

One embodiment of the present invention sets forth a technique controlling the pixel location at which the plane equation is evaluated. Multiple pixel offsets (dx, dy) may be specified that each define to a sub-pixel sample position. Attributes are then calculated for each sub-pixel sample position that is covered by a geometric primitive. One advantage of the technique is that anti-aliasing quality may be improved since high frequency color components may be selectively super-sampled for particular geometric primitives.

15 Claims, 10 Drawing Sheets

USING A PIXEL OFFSET FOR EVALUATING A PLANE EQUATION

CROSS-REFERENCE TO RELATED APPLICATIONS

This application claims priority benefit to U.S. provisional patent application titled, "EVALUATING PLANE EQUATION AT PIXEL OFFSET," filed on Oct. 6, 2009 and having Ser. No. 61/249,224.

BACKGROUND OF THE INVENTION

1. Field of the Invention

Embodiments of the invention relate generally to plane equation for an attribute at a pixel (x,y) location.

2. Description of the Related Art

An interpolate attribute shader opcode is used to evaluate the plane equation for an attribute at a pixel (x,y) location. In conventional systems, the plane equation is evaluated at either the center of the pixel (0.5, 0.5) or at the centroid of the pixel, where the centroid is the covered sample position within the pixel that is nearest to the center of the covered region of the pixel.

Accordingly, what is needed in the art is an improved technique for controlling the pixel location at which the plane equation is evaluated.

SUMMARY OF THE INVENTION

A system and method for controlling the pixel location at which the plane equation is evaluated enables the calculation of a per-subsample value at any valid (x,y) offset for a pixel. One advantage of the technique is that anti-aliasing quality may be improved since high frequency attributes may be selectively supersampled. Higher quality filtering may also be provided for some images by sampling outside of the pixel.

Various embodiments of a method of the invention for calculating an attribute value, include receiving an attribute interpolation opcode and obtaining pixel offsets dx and dy that specify a sub-pixel sample position (x+dx, y+dy) that is offset from a reference position (x,y) within a pixel. An interpolated attribute is calculated for the sub-pixel sample position by evaluating the function $A^*(x+dx)+B^*(y+dy)+C$, wherein A, B, and C are attribute-specific plane equation coefficients. The interpolated attribute for the sub-pixel sample position is stored in a destination register.

Various embodiments of a system of the invention for calculating an interpolated attribute value include an attribute interpolation execution unit that is configured to receive an attribute interpolation opcode and obtain pixel offsets dx and dy that specify a sub-pixel sample position (x+dx, y+dy) that is offset from a reference position (x,y) within a pixel. The attribute interpolation execution unit calculates an interpolated attribute for the sub-pixel sample position by evaluating the function $A^*(x+dx)+B^*(y+dy)+C$, wherein A, B, and C are attribute-specific plane equation coefficients and stores the interpolated attribute for the sub-pixel sample position in a destination register.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
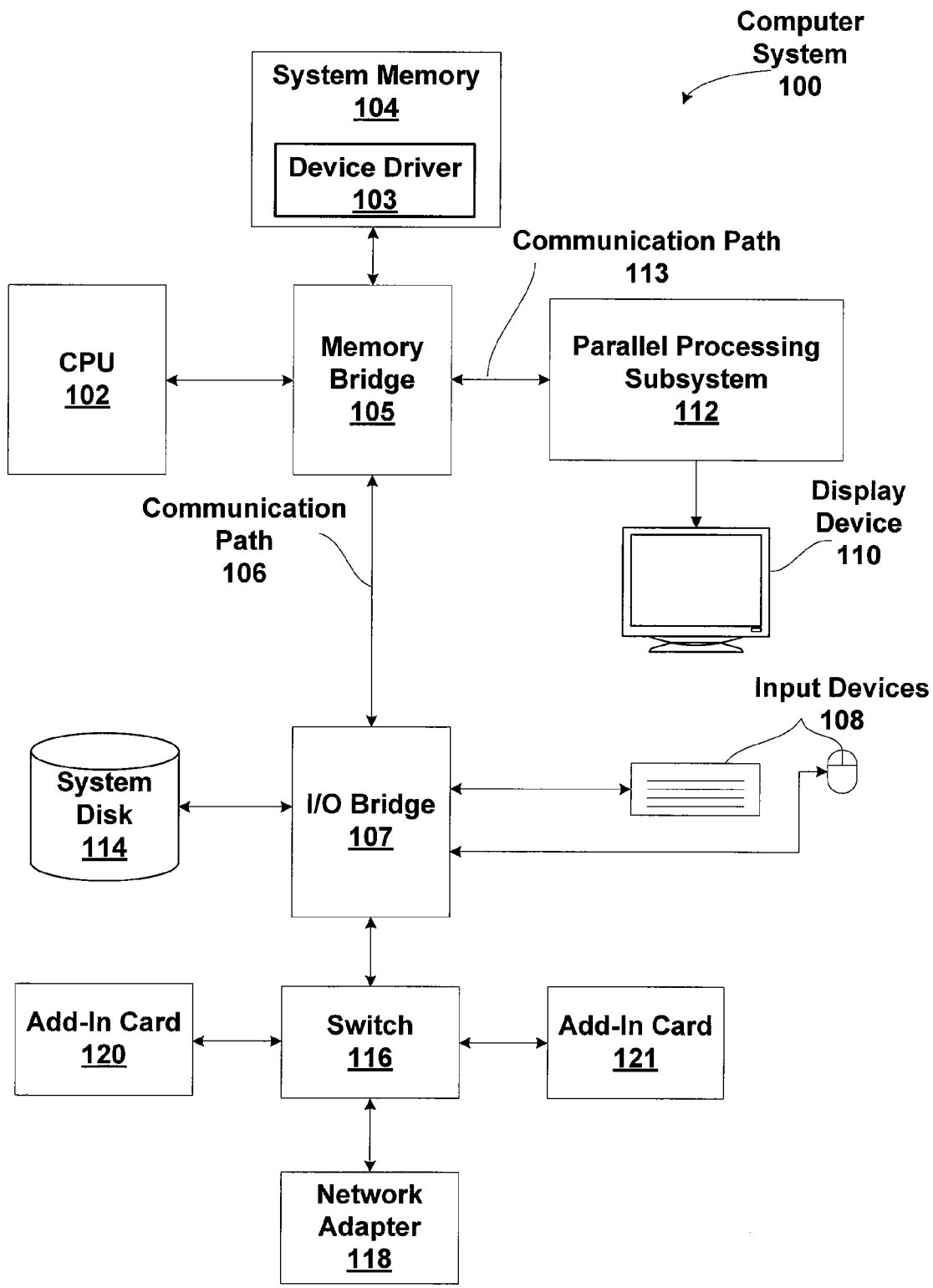
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
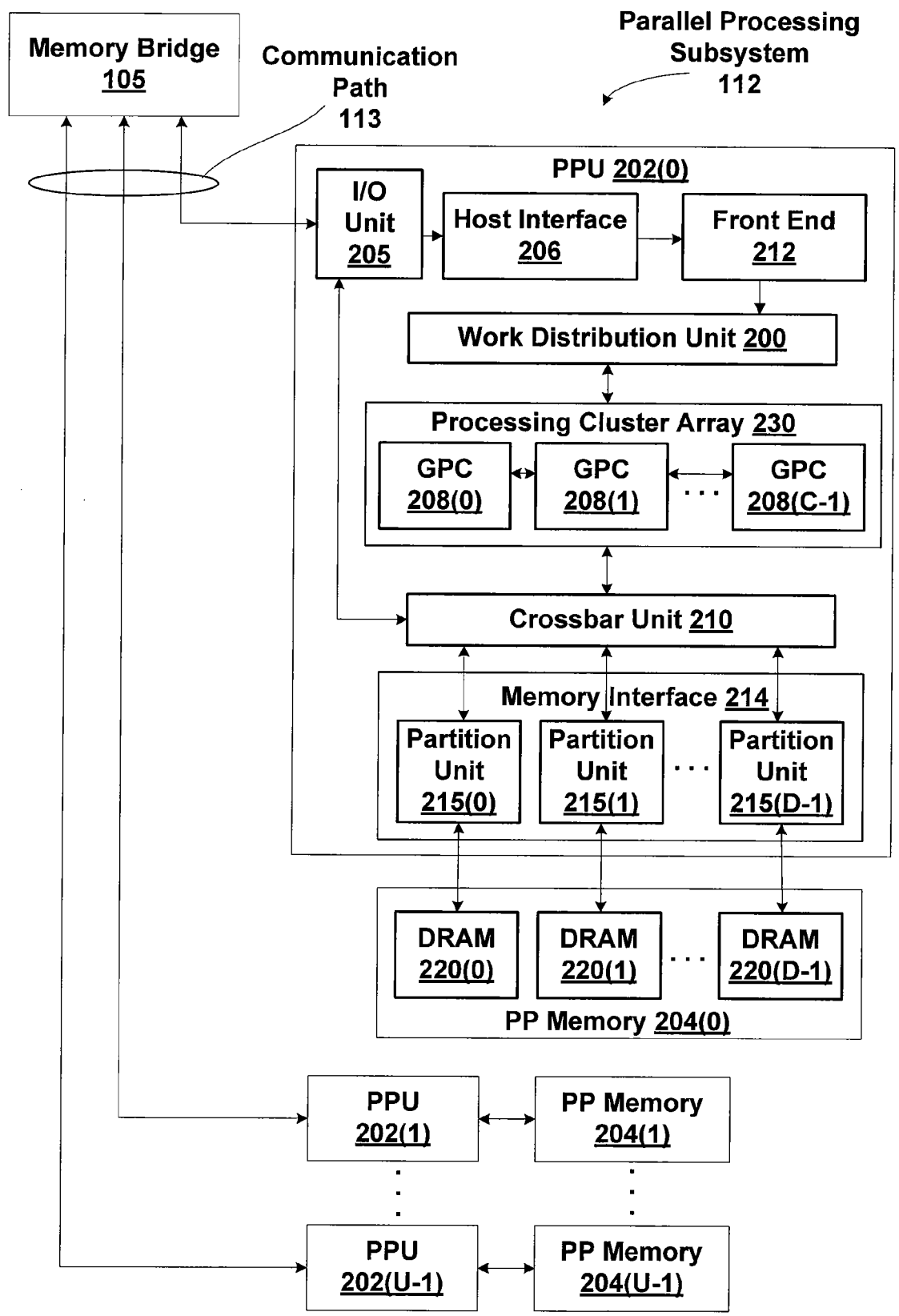
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
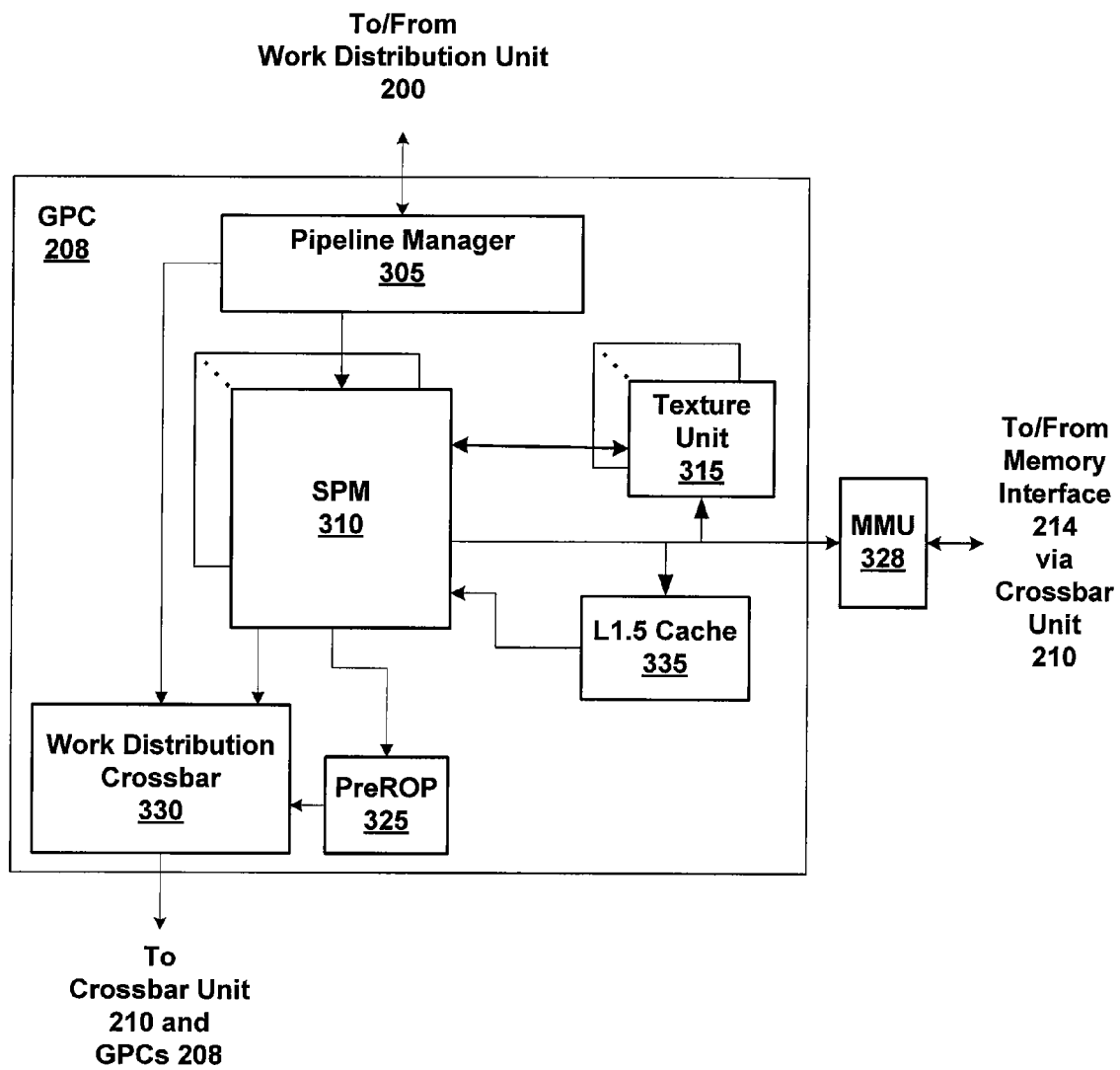
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
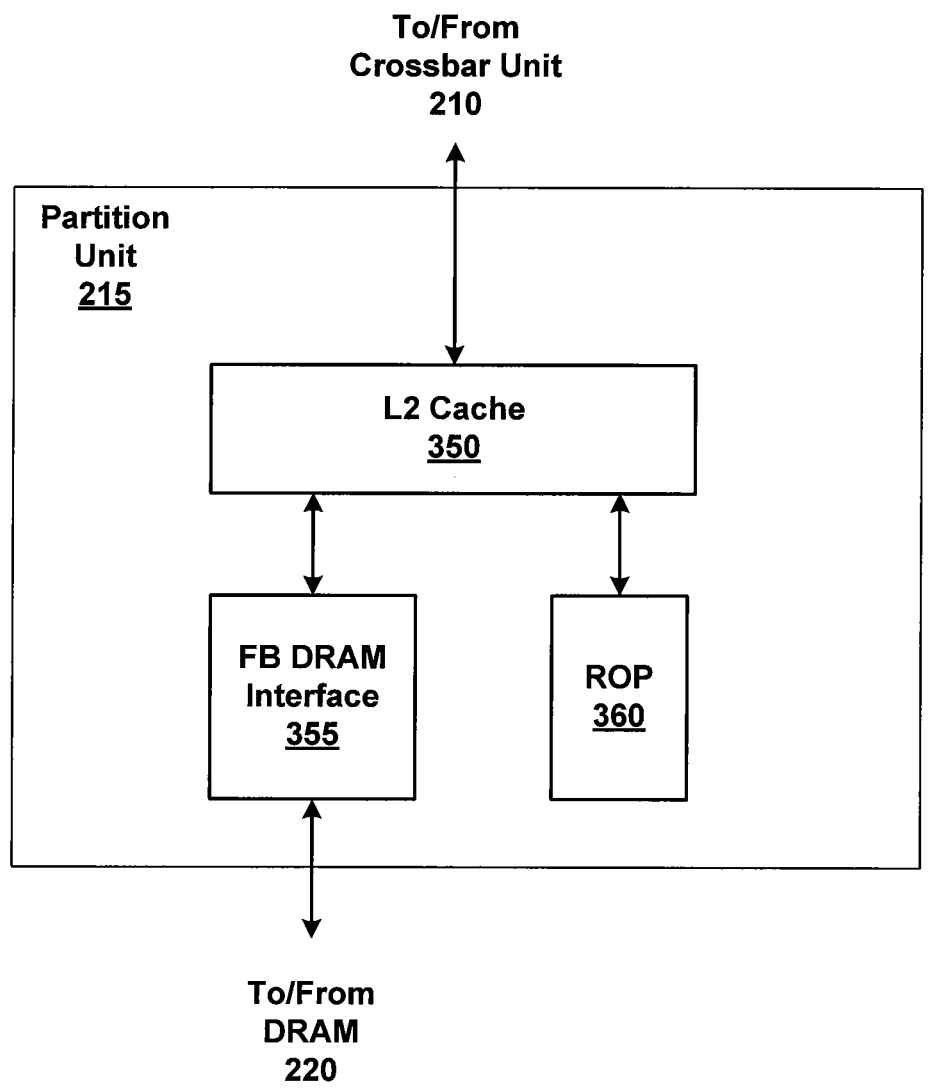
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
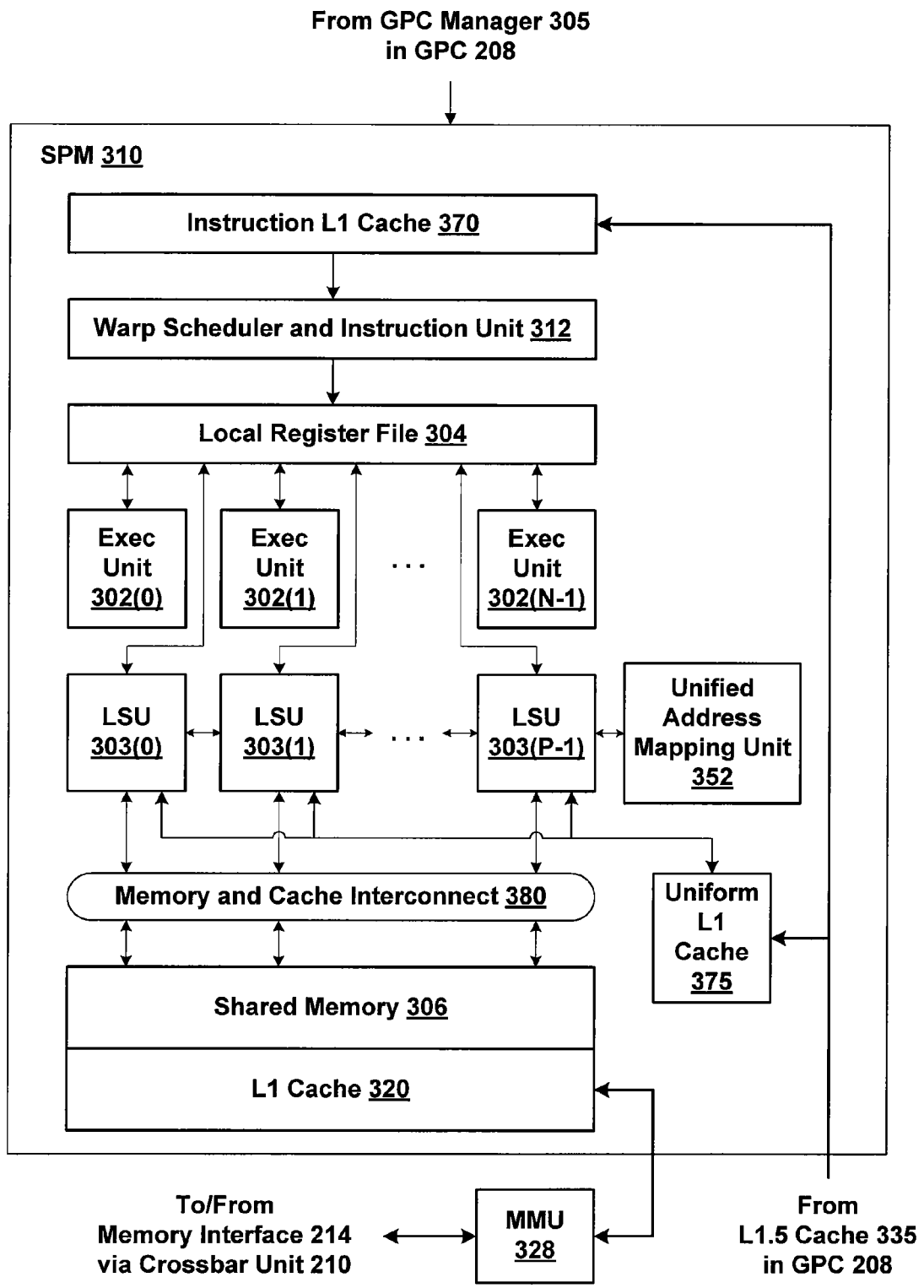
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on—chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
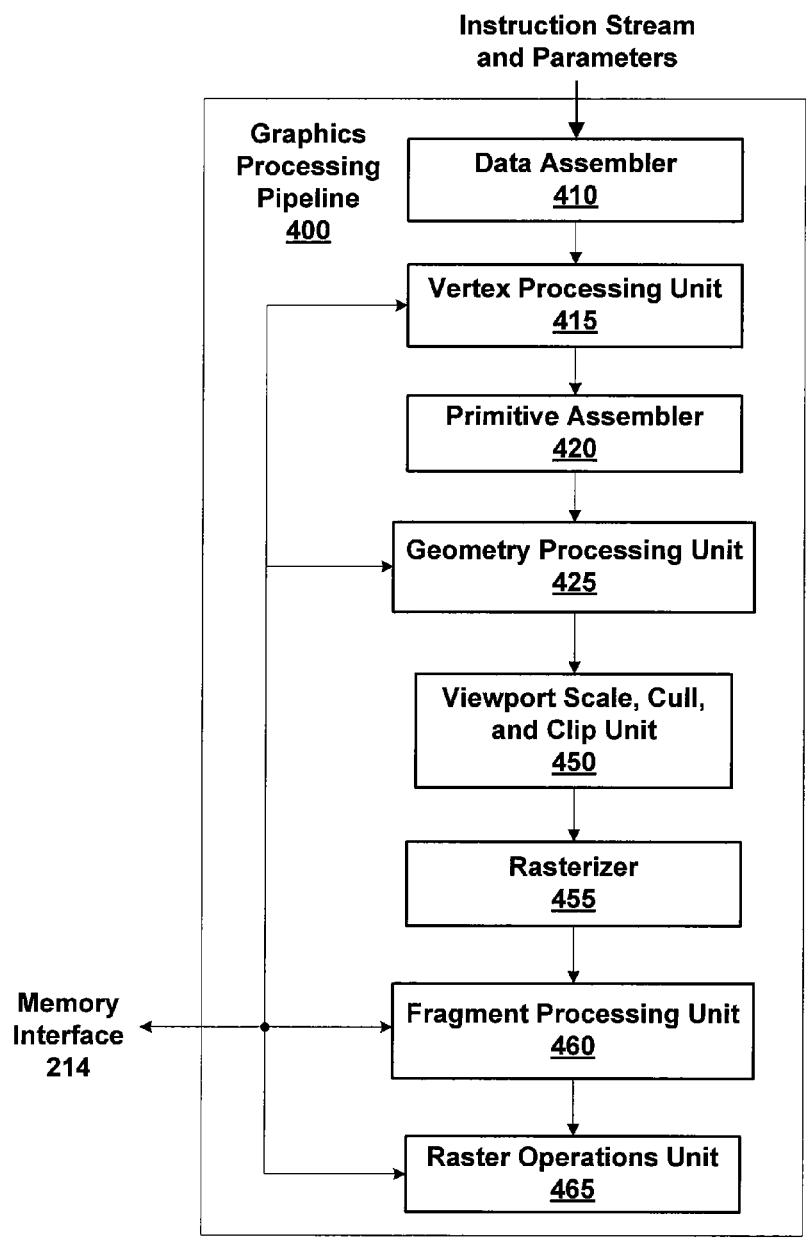
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Although the method steps are described in conjunction with the systems of FIGS. 1, 2, 3A, 3B, and 3C, persons skilled in the art will understand that any system configured to perform the method steps, in any order, is within the scope of the inventions.

Plane Equation Evaluation Using Offsets

Evaluation of a plane equation (Ax+By+C) is performed to interpolate attributes specified for the graphics primitives. In some embodiments, the plane equation is evaluated using 32-bit floating point math operations. In conventional systems, an IPA (Interpolate Attribute) shader opcode is used to evaluate the plane equation for an attribute at a pixel at either the center of a pixel (0.5, 0.5) or the centroid. A new feature of the IPA shader opcode allows for a pixel offset (x,y) to be specified that is used to evaluate a plane equation for an attribute, e.g., color component, depth, w, or the like. The pixel offsets may be relative to the center of a pixel. Attributes may be calculated at one or more of the pixel offset positions for one or more pixels or primitives. Additionally, the pixel offsets that are used to render a particular pixel or primitive can be calculated or queried using a PIXLD (pixel load) opcode.

The IPA instruction requires a destination register (Rd) that will store the interpolated attribute and an input attribute operand to be interpolated. A second operand may be provided to specify the pixel offset (dx,dy). In one embodiment, a third operand may be provided that the interpolated attribute is scaled by before being stored in the destination register. The different sampling modes that may be specified for the IPA opcode are the pixel center, centroid, and pixel offset. The attribute to be interpolated is specified as a[lmm] or a[Ra+lmm], where the attribute a is read using the attribute address lmm when the address mode is immediate or Ra+lmm when the address mode is immediate indexed.

When Ra is not specified or Ra is RZ, the attribute address is an unsigned 10-bit immediate. When Ra is specified and is not RZ, the attribute address is the sum of register Ra and an 11-bit signed immediate. In one embodiment, the address register Ra is unsigned and in bytes, the immediate (lmm) is also in bytes, and each plane is 12 bytes in size. The attribute plane equation coefficients (A, B, and C) are read from a triangle ram (TRAM) that is accessed at the specified address. The IPA then returns Ax+By+C, where (x,y) is the sample location for the pixel. When pixel offsets are used, the IPA returns A(x+dx)+B(y+dy)+C.

When the sampling mode is specified as offset x and y offsets, (dx,dy) are used to compute a sample position that is offset from the center of the pixel. An operand, Rc specifies the register that stores (dx,dy). In one embodiment the format for the x and y offsets is:

dx[15:00], format is signed integer pixel[15:12].subpixel [11:00]

dy[31:16], format is signed integer pixel[31:28].subpixel [27:16]

The sample position is computed as (x+dx, y+dy), where x and y are the center of the pixel. In one embodiment the values of dx and dy are defined for a pixel with 256 different sub-pixel sample positions (16 dx values and 16 dy values) as:

1111.100000000000=−8/16
1111.100100000000=−7/16
1111.101000000000=−6/16
1111.101100000000=−5/16
1111.110000000000=−4/16
1111.110100000000=−3/16
1111.111000000000=−2/16
1111.111100000000=−1/16
0000.000000000000=0/16//(x+dx, y+dy) is center of pixel
0000.000100000000=1/16
0000.001000000000=2/16
0000.001100000000=3/16
0000.010000000000=4/16
0000.010100000000=5/16
0000.011000000000=6/16
0000.011100000000=7/16

Figure 5A:
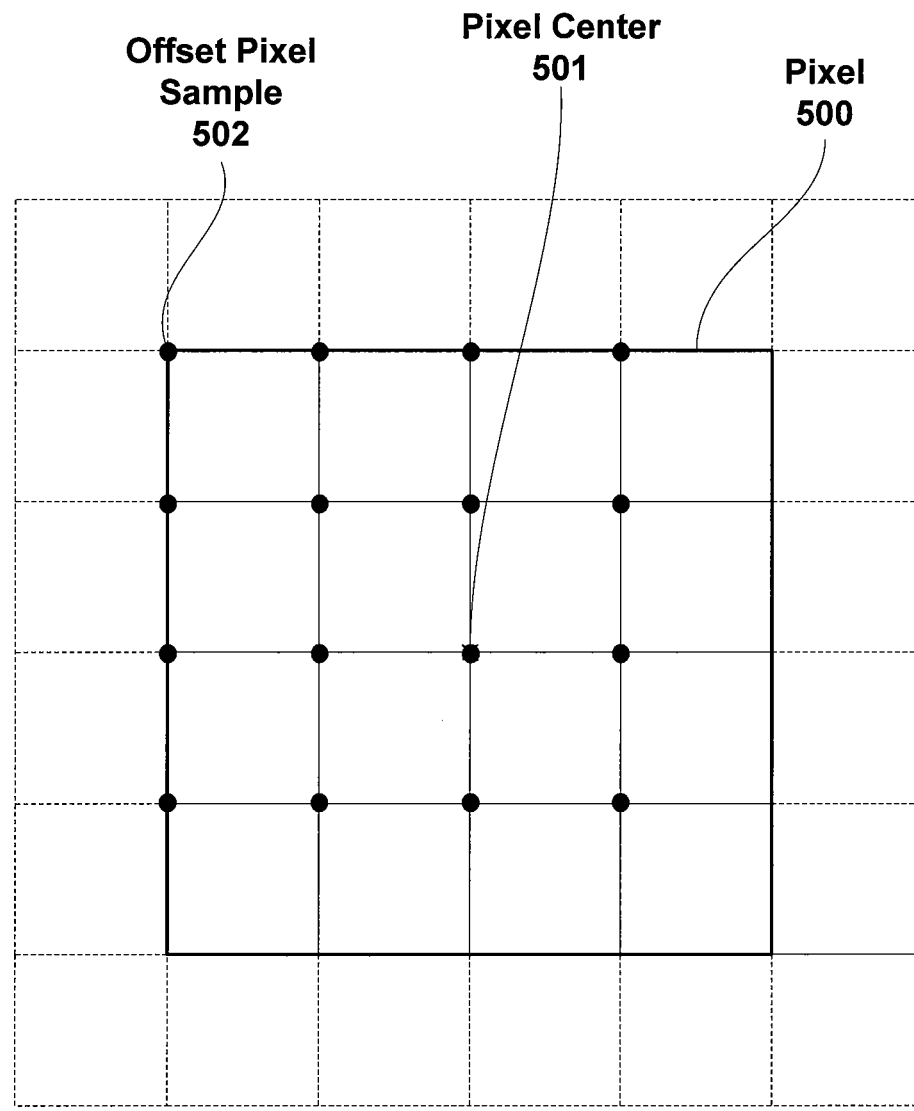
FIG. 5A is a diagram of sample positions corresponding to pixel offsets, according to one embodiment of the present invention.

FIG. 5A is a diagram of sample positions corresponding to pixel offsets for a pixel 500, according to one embodiment of the present invention. A pixel center 501 is shown in the center of the pixel 500. The pixel 500 is divided into 16 sub-pixels with corresponding sub-pixel sample positions. Each sub-pixel sample position is associated with a different pixel offset, (dx, dy) and sub-pixel sample index. In other embodiments, different sub-pixel sample positions may be used. An offset pixel sample 502 is associated with dx=1111.1000 and dy=0000.0111, e.g., dx=−2/4 and dy=+1/4. Note, that the dx and dy values include integer portions, and therefore, an offset pixel sample may be specified that is outside of the pixel 500. Offset pixel samples that are outside of the pixel may be used to filter high-frequency attributes to produce images with improved quality.

Figure 5B:
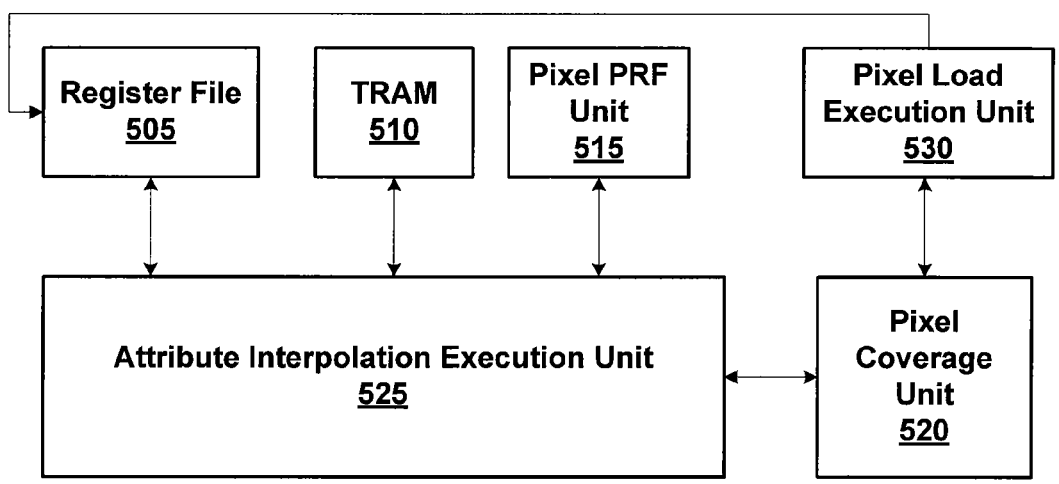
FIG. 5B is a block diagram of the attribute interpolation unit and the pixel load unit, according to one embodiment of the present invention.

FIG. 5B is a block diagram of the attribute interpolation execution unit 525 and the pixel load execution unit 530, according to one embodiment of the present invention. The attribute interpolation execution unit 525 and the pixel load execution unit 530 may be included within each exec unit 302 of an SPM 310. A pixel coverage unit 520 stores the sub-pixel sample coverage for a graphics primitive that intersects the pixel or a pixel tile including multiple pixels. The sub-pixel sample coverage mask for each graphics primitive is computed during rasterization. The pixel coverage unit 520 may also be configured to store a centroid offset that is the offset of the pixel centroid relative to a reference position.

A PIXLD opcode may be used to obtain information about a pixel, such as the sub-pixel coverage, pixel offset positions, and the number of sub-pixel sample positions (multisample mode). PIXLD .COVMASK returns a boolean coverage mask, where the number of valid bits depends on the current multisample mode. PIXLD .COVERED returns a Boolean TRUE/FALSE indicating whether or not a sub-pixel sample position associated with an input sub-pixel sample index is covered or not. PIXLD .OFFSET returns the sub-pixel sample offset (dx,dy) for an input sample index. In one embodiment the samples are on a 16*16 pixel grid, and are returned as a pair of 16 bit signed integers in the range (−8,+7). dx starts at bit position 0, dy starts at bit position 16. The input sub-pixel sample index is valid from 0 to MultiSampleCount-1.

In particular, the pixel load execution unit 530 may be configured to execute a PIXLD opcode to obtain the sub-pixel sample coverage mask or to obtain the sub-pixel offset positions for a pixel. The pixel offset positions may be stored in another storage resource within the GPC 208. The pixel load execution unit 530 may also write an obtained value, e.g., the sub-pixel offset positions, to the register file 505. In one embodiment the pixel load execution unit 530 may also write the sub-pixel sample coverage mask to the register file 505. The TRAM 510 is configured to store the plane equation coefficients for the different attributes. The pixel PRF (parameter register file) unit 515 is configured to store the x,y location of a pixel tile that includes multiple pixels. When combined with a pixel identifier, the x,y location is used to determine the center of the pixel in screen (or image) space.

The attribute interpolation execution unit 525 is configured to evaluate an attribute-specific plane equation to produce an interpolated attribute. When evaluating the attribute-specific plane equation, $A(x+dx)+B(y+dy)+C$, coefficients A, B, and C are provided by the TRAM 510, the pixel center position coordinates x and y are provided by the pixel PRF unit 515, and the sub-pixel offsets dx and dy are provided by the register file 505. The pixel coverage mask may be used to evaluate the attribute-specific plane equation only for covered sub-pixel sample positions. In one embodiment, the IPA shader opcode receives up to three operands, an attribute address, a sub-pixel offset (dx, dy), and w.

Figure 6A:
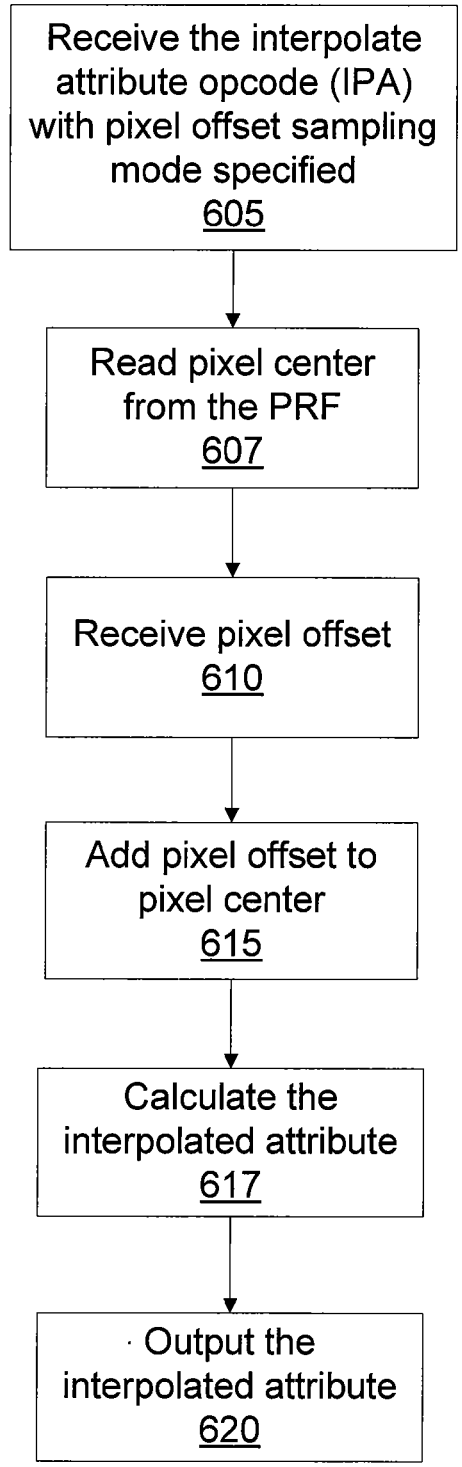
FIG. 6A is a flow diagram of method steps for executing a pixel load instruction to query a pixel offset, according to one embodiment of the present invention.

FIG. 6A is a flow diagram of method steps 600 for executing an attribute interpolation instruction, according to one embodiment of the present invention. At step 605 an interpolate attribute opcode is received by the attribute interpolation execution unit 525 with the pixel offset sampling mode specified. At step 607 the attribute interpolation execution unit 525 reads the pixel tile position from the pixel PRF unit 515 in order to determine the pixel center position. At step 610 the sub-pixel offset is received as an operand for the IPA shader opcode. In another embodiment, the attribute interpolation execution unit 525 reads the sub-pixel offset from the register file 505 using a register identifier provided as an operand for the IPA shader opcode. At step 615 the sub-pixel offset is added to the pixel center position to compute the sub-pixel sample position. In other embodiments, the sub-pixel offset is added to a reference position defined for the pixel. At step 620 the sub-pixel sample position and attribute-specific plane equation coefficients provided by the TRAM 510 are used by the attribute interpolation execution unit 525 to calculate the interpolated attribute for the sub-pixel sample position corresponding to the sub-pixel offset. When w is provided as an operand for the IPA shader opcode, the interpolated attribute is scaled by w. The interpolated attributes for one or more sub-pixel sample positions may be filtered to produce a final attribute value for a pixel.

A shader program may be configured to execute an IPA shader opcode for each multisample of a pixel or for each covered multisample of a pixel. Additionally, a shader program may execute an IPA shader opcode for any number of pixel offsets, even if the number of sub-pixel samples specified by the pixel offsets is greater than the number of multisamples. The multisamples specify a "valid" set of sub-pixel sample positions corresponding to a set of the pixel offsets. An attribute may be sampled at a higher resolution by computing the attribute for pixel offsets that are not included in the set of pixel offsets. However, sample coverage may only be available for the "valid" set of sub-pixel sample positions.

Figure 6B:
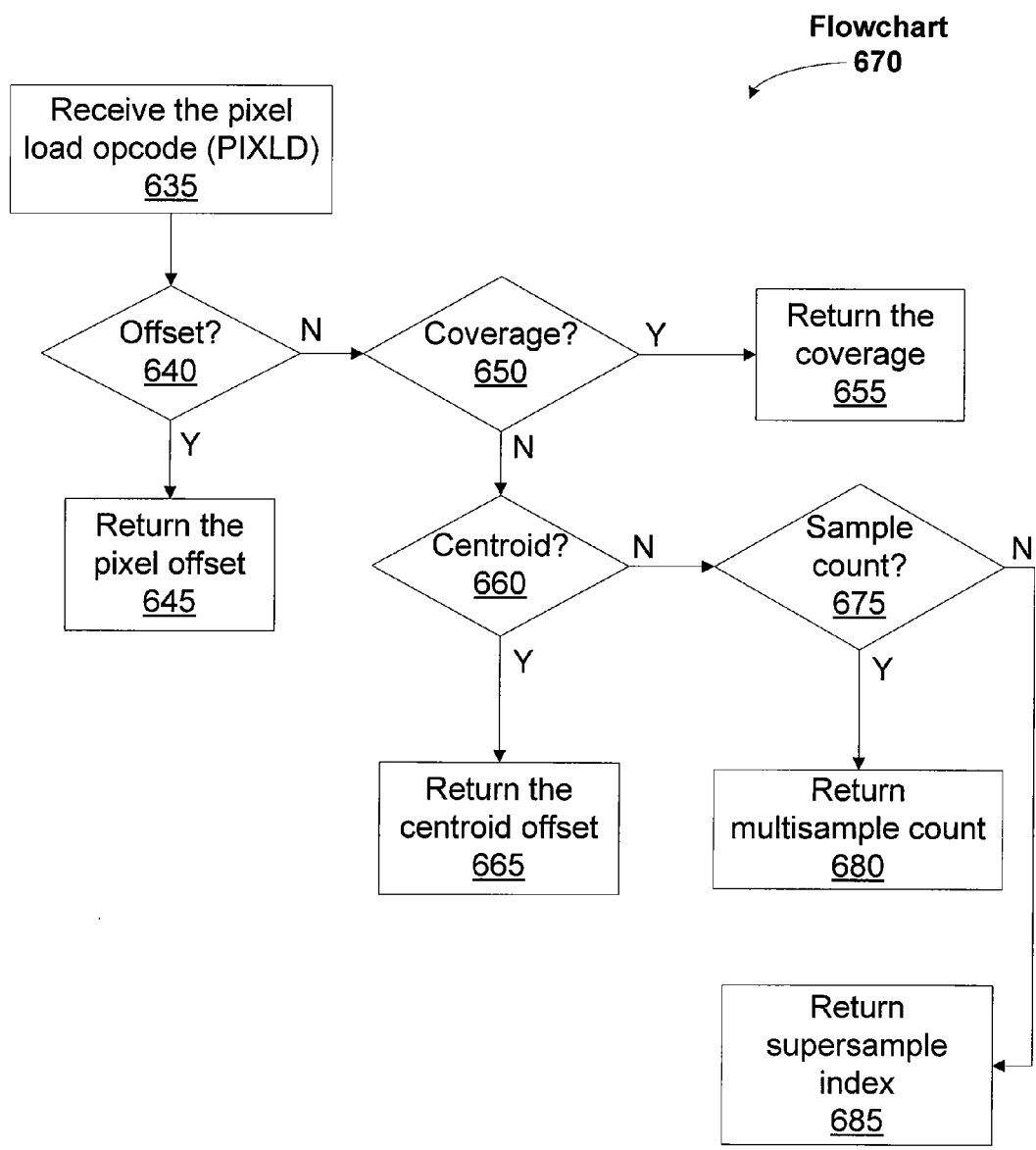
FIG. 6B is a flow diagram of method steps for executing a interpolate attribute instruction, according to one embodiment of the present invention.

FIG. 6B is a flow diagram of method steps 670 for executing a pixel load instruction, according to one embodiment of the present invention. At step 635 a pixel load opcode is received by the pixel load execution unit 530. At step 640 the pixel load execution unit 530 determines if the pixel load opcode queries the pixel offset for an input offset index, and, if so then at step 645 the sub-pixel offset associated with the input offset index is obtained and stored in the register file 505. In one embodiment, the sub-pixel offsets for all of the sub-pixel samples in a pixel are read and stored in the register file 505.

If at step 640 the pixel load execution unit 530 determines that the pixel load opcode does not query the pixel offset, then at step 650 the pixel load execution unit 530 determines if the pixel load opcode queries the coverage mask (for the pixel or sub-pixel sample), and, if so, at step 655 the pixel load execution unit 530 accesses the pixel coverage unit 520 and returns the requested coverage value. If at step 650 the pixel load execution unit 530 determines that the pixel load opcode does not query the coverage, then at step 660 the pixel load execution unit 530 determines if the pixel load opcode queries the centroid offset, and, if so, then at step 665 the pixel load execution unit 530 accesses the pixel coverage unit 520 and returns the requested centroid offset value. If at step 660 the pixel load execution unit 530 determines that the pixel load opcode does not query the centroid offset, then at step 675 the pixel load execution unit 530 determines if the pixel load opcode queries the multisample sample count (number of sub-pixel samples), and, if so, then at step 680 is the pixel load execution unit 530 returns the multisample sample count. Otherwise, at step 685 the pixel load execution unit 530 returns the supersample index which is an offset of the sub-pixel sample position specified for rendering a conventional supersampled image when the image is rendered once for each sub-pixel sample position.

The IPA opcode may be used to control the sub-pixel sampling rate for each pixel covered by a graphics primitive and improve the image quality. In particular, attributes that are varying at a high-frequency across a pixel or pixel tile may be sampled at a higher rate in order to supersample the pixel or pixel tile and produce an anti-aliased pixel tile. An attribute may be calculated for multiple sub-pixel sample positions and compared to determine if the attribute is varying at a high-frequency. When the attribute is varying at a high frequency, the attribute may be calculated for additional sub-pixel sample positions. When the attribute is not varying at a high frequency, the attribute may be calculated at the pixel centroid, center, or a subset of the sub-pixel sample positions.

In contrast, conventional supersampling rasterizes the geometric primitives multiple times, once for each sub-pixel sample position (regardless of per-pixel coverage). The supersampled pixels are then filtered to produce an image with anti-aliased attributes. When the IPA opcode is used to calculate sub-pixel attributes for particular pixels or geometric primitives, a supersampled image may be produced without calculating sub-pixel attributes for all sub-pixel positions, including those that are not covered by a graphics primitive. Therefore, images with anti-aliased attributes may be produced at a higher rate by the GPCs 208.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for calculating an attribute value, comprising:
   receiving an attribute interpolation opcode;
   obtaining pixel offsets dx and dy that specify a sub-pixel sample position (x+dx, y+dy) that is offset from a reference position (x,y) within a pixel;
   calculating an interpolated attribute for the sub-pixel sample position by evaluating the function $A*(x+dx)+B*(y+dy)+C$, wherein A, B, and C are attribute-specific plane equation coefficients;
   comparing the interpolated attribute for the sub-pixel sample position with the interpolated attribute for a second sub-pixel sample position within the pixel to determine whether the attribute value varies across the pixel; and
   upon determining that the attribute value varies across the pixel:
      obtaining additional pixel offsets that specify additional sub-pixel sample positions that are offset from the reference position within the pixel;
      calculating additional interpolated attributes for the additional sub-pixel sample positions; and
      combining the interpolated attributes for the sub-pixel sample position, the second sub-pixel sample position, and the additional sub-pixel sample positions to produce an interpolated attribute for the pixel.

2. The method of claim 1, wherein the number of sub-pixel sample positions is greater than the number of valid sub-pixel samples specified for each pixel, the number of the sub-pixel sample positions including the sub-pixel sample position, the second sub-pixel sample position, and any additional sub-pixel sample positions.

3. The method of claim 1, further comprising:
   receiving a pixel load opcode prior to receiving the attribute interpolation opcode; and
   storing the pixel offsets in a register to complete execution of the pixel load opcode.

4. The method of claim 3, wherein the obtaining of the pixel offsets comprises reading the register.

5. The method of claim 1, further comprising:
   outputting the interpolated attribute for the pixel to complete execution of the attribute interpolation opcode.

6. The method of claim 1, further comprising determining that the sub-pixel sample position is covered by a geometric primitive associated with the attribute value prior to calculating the interpolated attribute for the sub-pixel sample position.

7. The method of claim 1, wherein the sub-pixel sample position is located outside of the pixel.

8. A non-transitory computer-readable storage medium storing instructions that, when executed by a processor, cause the processor executing a program to calculate an attribute value by performing the steps of:

receiving an attribute interpolation opcode;

obtaining pixel offsets dx and dy that specify a sub-pixel sample position (x+dx, y+dy) that is offset from a reference position (x,y) within a pixel;

calculating an interpolated attribute for the sub-pixel sample position by evaluating the function $A*(x+dx)+B*(y+dy)+C$, wherein A, B, and C are attribute-specific plane equation coefficients;

comparing the interpolated attribute for the sub-pixel sample position with the interpolated attribute for a second sub-pixel sample position within the pixel to determine whether the attribute value varies across the pixel; and upon determining that the attribute value varies across the pixel:
- obtaining additional pixel offsets that specify additional sub-pixel sample positions that are offset from the reference position within the pixel;
- calculating additional interpolated attributes for the additional sub-pixel sample positions; and
- combining the interpolated attributes for the sub-pixel sample position, the second sub-pixel sample position, and the additional sub-pixel sample positions to produce an interpolated attribute for the pixel.

9. A system for calculating an interpolated attribute value, comprising:

an attribute interpolation execution circuit that:

receives an attribute interpolation opcode;

obtains pixel offsets dx and dy that specify a sub-pixel sample position (x+dx, y+dy) that is offset from a reference position (x,y) within a pixel;

calculates an interpolated attribute for the sub-pixel sample position by evaluating the function $A*(x+dx)+B*(y+dy)+C$, wherein A, B, and C are attribute-specific plane equation coefficients;

comparing the interpolated attribute for the sub-pixel sample position with the interpolated attribute for a second sub-pixel sample position within the pixel; and upon determining that the attribute value varies across the pixel:
- obtains additional pixel offsets that specify additional sub-pixel sample positions that are offset from the reference position within the pixel;
- calculates additional interpolated attributes for the additional sub-pixel sample positions; and
- combines the interpolated attributes for the sub-pixel sample position, the second sub-pixel sample position, and the additional sub-pixel sample positions to produce an interpolated attribute for the pixel.

10. The system of claim 9, wherein the number of sub-pixel sample positions is greater than the number of valid sub-pixel samples specified for each pixel, the number of the sub-pixel sample positions including the sub-pixel sample position, the second sub-pixel sample position, and any additional sub-pixel sample positions.

11. The system of claim 9, further comprising a pixel load execution circuit that:
receives a pixel load opcode prior to receiving the attribute interpolation opcode; and
stores the pixel offsets in a register to complete execution of the pixel load opcode.

12. The system of claim 11, wherein the attribute interpolation execution circuit further obtains the pixel offsets by reading the register.

13. The system of claim 9, wherein the attribute interpolation execution circuit further:
outputs the interpolated attribute for the pixel to complete execution of the attribute interpolation opcode.

14. The system of claim 9, wherein the attribute interpolation execution circuit further determines that the sub-pixel sample position is covered by a geometric primitive associated with the attribute value prior to calculating the interpolated attribute for the sub-pixel sample position.

15. The system of claim 9, wherein the sub-pixel sample position is located outside of the pixel.

* * * * *